United States Patent [19]
Takahashi et al.

[11] Patent Number: 5,187,874
[45] Date of Patent: Feb. 23, 1993

[54] COORDINATE MEASURING MACHINE WITH PROTECTED ORIGIN POINT BLOCKS

[75] Inventors: Keizo Takahashi; Masakazu Matsumoto, both of Utsunomiya, Japan

[73] Assignee: Mitutoyo Corporation, Tokyo, Japan

[21] Appl. No.: 651,419

[22] PCT Filed: Apr. 27, 1990

[86] PCT No.: PCT/JP90/00551

§ 371 Date: Feb. 8, 1991

§ 102(e) Date: Feb. 8, 1991

[87] PCT Pub. No.: WO90/13791

PCT Pub. Date: Nov. 15, 1990

[30] Foreign Application Priority Data

Apr. 28, 1989 [JP] Japan .................................. 1-111800

[51] Int. Cl.⁵ .............................................. G01B 21/04
[52] U.S. Cl. ......................................... 33/502; 33/503; 33/567; 33/703; 73/1 J; 220/335
[58] Field of Search ................. 33/502, 503, 703, 704, 33/705, 567, 832; 73/1 J, 1 E, 1 R; 220/335

[56] References Cited

U.S. PATENT DOCUMENTS

| 1,659,969 | 2/1928 | Baker | 33/705 |
| 4,372,461 | 2/1983 | Lerman et al. | 220/335 |
| 4,523,450 | 6/1985 | Herzog | 33/503 |
| 4,603,482 | 8/1986 | Cusack | 33/705 |
| 4,649,623 | 3/1987 | Schneider et al. | 33/561 |
| 4,777,818 | 10/1988 | McMurtry | 33/503 |
| 4,788,999 | 12/1988 | Dalpane | 220/335 |
| 4,901,256 | 2/1990 | McMurtry et al. | 33/503 |

FOREIGN PATENT DOCUMENTS

| 59-80708 | 5/1984 | Japan . | |
| 0178310 | 10/1984 | Japan | 33/503 |
| 0091511 | 5/1986 | Japan | 33/703 |
| 0095202 | 5/1986 | Japan | 33/703 |

Primary Examiner—William A. Cuchlinski, Jr.
Assistant Examiner—Alvin Wirthlin
Attorney, Agent, or Firm—Flynn, Thiel, Boutell & Tanis

[57] ABSTRACT

A coordinate measuring machine capable of selectively setting the origin of measurement by origin point blocks each of which are provided on the base plate of the coordinate measuring machine. In a condition where dust becomes attached to the origin point block, the origin of measurement is missed and the accuracy of the measurement is therefore unreliable. The machine in this invention is arranged to employ cover devices (40A, 40B, 80) to enclose origin point blocks (50A, 50B, 70) respectively and to occasionally expose a portion thereof by an opening and closing motion. That is, only when setting the origin of measurement is the cover opened. This prevents the origin point block from collecting dust thereon suspended in the air. In this end, the origin of measurement can be set precisely to execute an accurate measurement of the object to be measured. Such a technique may be applied to an efficient coordinate measuring machine which has a system to set the origin of measurement by the origin point block having a master ball.

4 Claims, 5 Drawing Sheets

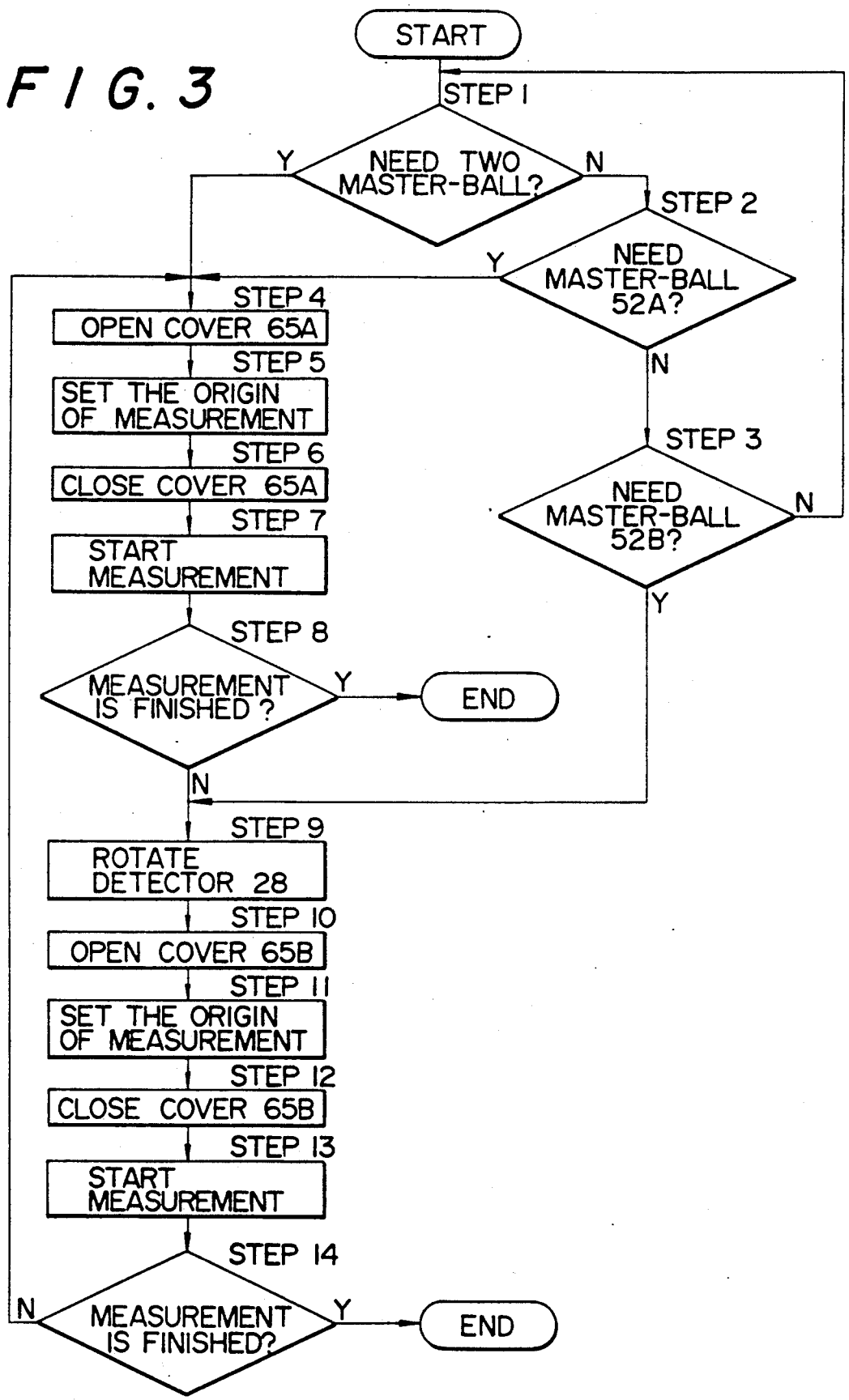

COORDINATE MEASURING MACHINE WITH PROTECTED ORIGIN POINT BLOCKS

TECHNICAL FIELD

This invention refers to a coordinate measuring machine, especially to a coordinate measuring machine equipped with protected origin point blocks thereon.

BACKGROUND ART

Various kinds of coordinate measuring machines are known for precisely measuring a configuration of and dimensions of an object to be measured. Some of them consists of a base for supporting an object to be measured thereon, origin point blocks, each of which has a master ball serving as the origin of measurement and being disposed at a certain point on the base, a first moving device having a gantry shape and moving essentially horizontally on the base, a second moving device movable nearly horizontally on the first moving device, and a third moving device which vertically moves through the second moving device and is provided with a detector.

When detecting the dimensions and configuration of the object by the coordinate measuring machine, the detector is contacted with the master ball to set the origin for measurement, then touching the object by moving the first, the second, and the third moving devices respectively so as to measure the dimensions and configuration of the object.

It is known that such a conventional coordinate measuring machine is ordinarily operated in a special environmentally controlled room which is kept at an average temperature and humidity to enhance measuring accuracy. However, usually there are several production processes or steps required to produce commodities in a factory, so that if each process step requires the measurement of the dimension and configuration of the commodities, several conventional coordinate measuring devices will be needed in the factory. This causes some problems.

The temperature and humidity in a factory is not always constant and when processing the work by a machine tool, small grains of waste matter are raised, become suspended in the air and then become attached to the master ball.

In this case, because the coordinate measuring machine is expected to precisely measure the object, the dust particles on the master ball negatively influences the detector causing the detector to thereby miss the origin of measurement. Incidentally, a precise measurement of the object cannot be conducted.

An object of the present invention is to protect the origin point block from the dust suspended in the air and to prevent the dust from collecting on the master ball of the origin point block. Accordingly, the origin of measurement can be set precisely and the accuracy of measurement by the coordinate measuring machine is improved by the present invention.

DISCLOSURE OF INVENTION

A coordinate measuring machine shown in this invention includes a base plate for supporting an object to be measured thereon, origin point blocks provided on the base plate to serve as an origin of measurement, a moving system having a detector which moves to the origin point blocks to set the origin of measurement and then moves in the horizontal and vertical directions to contact with the object to be measured for detecting the dimensions and configuration of the object, and cover devices for covering and occasionally exposing each of the origin point blocks.

The cover device preferably consists of a box for the origin point block and an openable and closeable cover having a shape corresponding to the box.

Otherwise, the cover device may include a box having a room inside for enclosing the origin point block, a cover having a shape corresponding to the box so as to open and close, and a drive device which is connected to the box and the cover for effecting an opening and closing motion of the cover.

In construction of the drive device for an opening and closing motion of the cover, it preferably has a telescopic fluid cylinder one end of which is joined with the box, the other end of which is joined with the cover.

To perform a measuring operation of the coordinate measuring machine in the present invention, the origin of measurement is first set by the origin point block. The position of the object to be measured is detected by moving the detector, the horizontal and vertical directions to contact the object.

Each of the origin point blocks for setting the origin of measurement is enclosed by the cover device which is capable of an opening and closing motion. The origin point block is usually covered with the cover device but exposed when setting the origin of measurement. Hence, the cover is opened only when necessary. Otherwise, the cover remains closed to prevent dust suspended in the air from gathering on the origin point block. In this end, the origin of measurement can be set precisely to execute an accurate measurement of the object to be measured.

BRIEF DESCRIPTION OF DRAWINGS

The preferred embodiments of the present invention will hereunder be described with reference to the drawings, in which:

FIG. 3 is a flow diagram explaining a measuring sequence in the first embodiment.

BEST MODE FOR CARRYING OUT THE INVENTION

Figure 1:
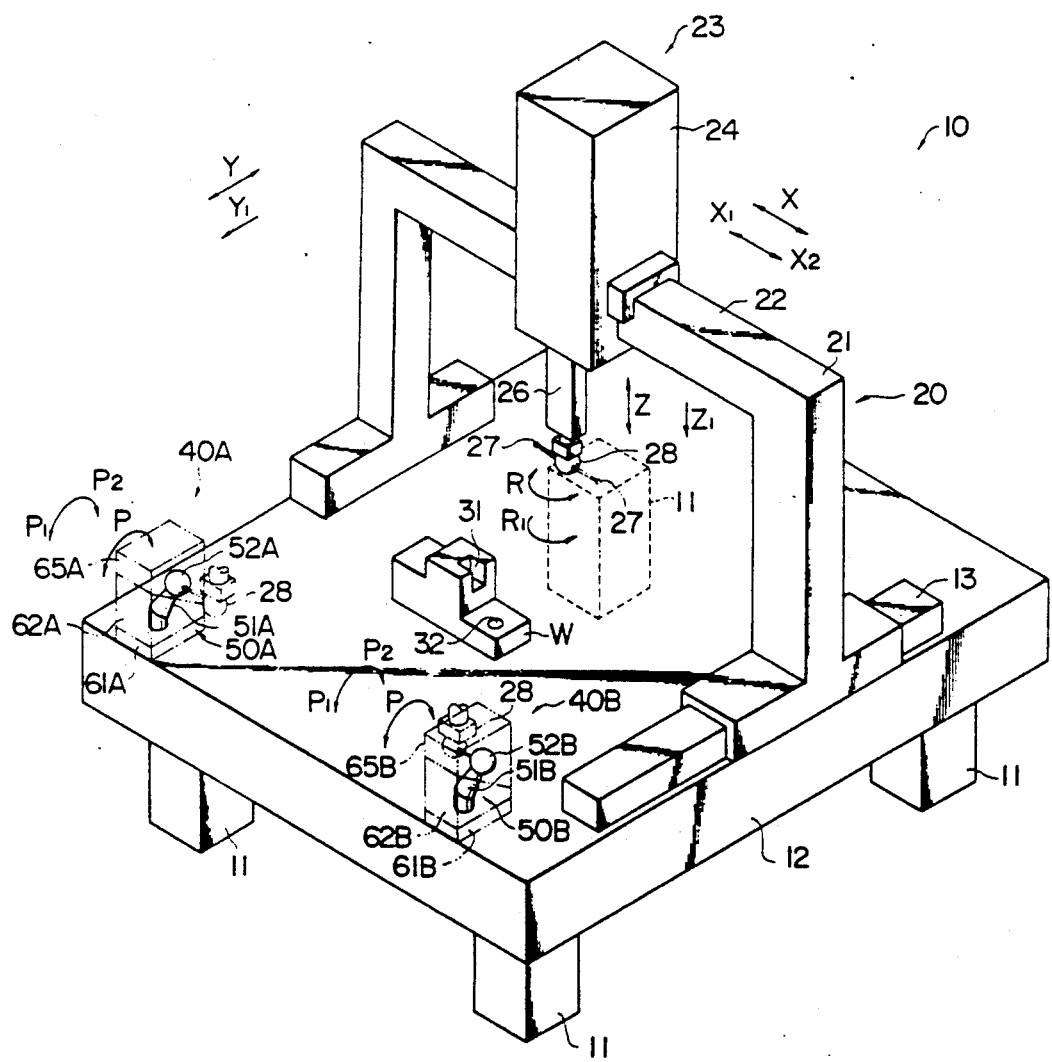
FIG. 1 is a perspective view showing the entire construction of a first embodiment of the present invention.

FIG. 1 shows a first embodiment of a coordinate measuring machine 10 embodying the the present invention.

The coordinate measuring machine 10 has a base plate 12 which is mounted on four legs 11 supported on the ground.

On the base plate 12, there is provided a guide rail 13, on which a Y-axis moving device 20 is provided and which is movable in the arrow Y-direction. The Y-axis moving device 20 has a gantry shaped support 21. A horizontal portion 22 of the support 21 is provided with an X-axis moving device 23 which is movable in the arrow X-direction.

The X-axis moving device 23 has a X-slider 24, in which a Z-axis slider 26 serving as a Z-axis moving device is provided as to movement in the arrow Z-direction. The Z-axis slider 26 has, at its end portion, a contacting type detector 28 employing a touch signal probe 27 which can rotate in the arrow R-direction.

The coordinate measuring machine 10 is connected to a computing machine not shown, by which a total control of the Y-axis moving device 20, X-axis moving device 23, Z-slider 26, and detector 28 is performed.

There is an object W to be measured which has, for example, a convex shape on the base plate 12. The object W is formed into a complicated construction, the upper surface of which has a recessed portion 31 and the lower surface of which has a hole 32.

At portions near the object W and on the edge of the base plate 12, there are two cover devices 40A, 40B.

Figure 2A:
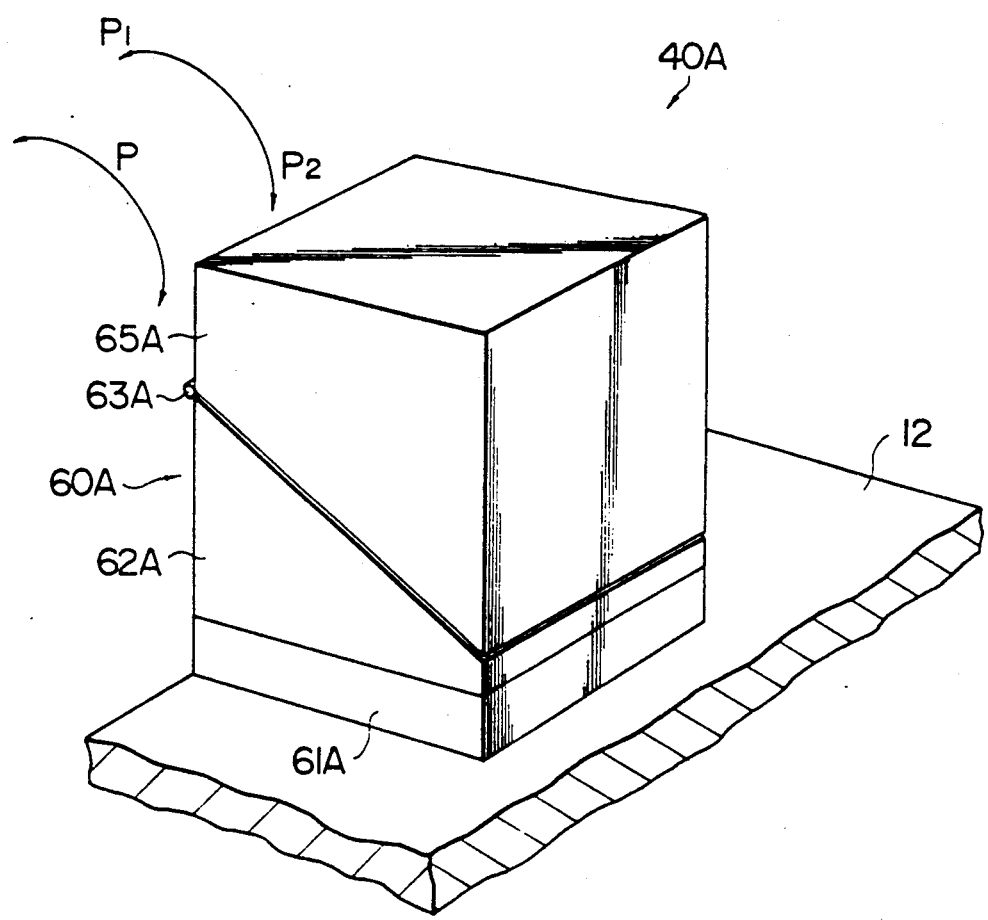
FIGS. 2(A) and 2(B) are each a fragmentary perspective view of the first embodiment.
Figure 2B:
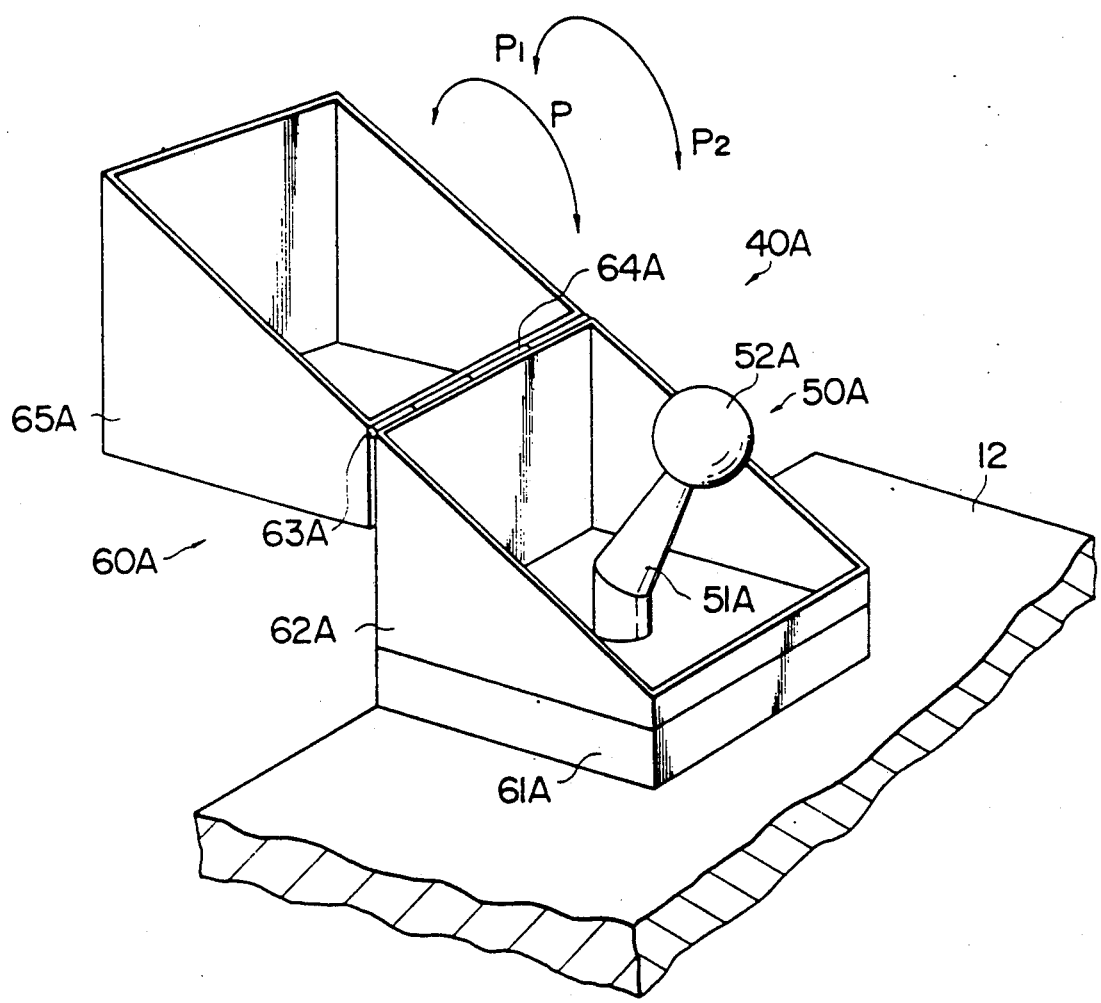

The cover device 40A has a characteristic construction which consists of an origin point block 50A and a box 60A to house the block 50A therein as shown in FIGS. 2(A) and 2(B).

The origin point block 50A has a main body 51A turned at angle in a portion thereof and a master ball 52A which is mounted on the top portion of the main body 51A and designed to have the origin of measurement in its center.

The box 60A consists of a plate 61A which is disposed on the base plate 12 and fastened thereon with the origin point block 50A by, for example, a screw, a box 62A which is mounted on the plate 61A and has a sectional trapezoid shape to surround the origin point block 50A, and a cover 65A which has a corresponding configuration to cover the opening of the box 62A and is joined with the box 62A by hinge fittings 63A, 64A to allow it to swing around the box 62A in the arrow P-direction.

Incidentally, in the description of the following embodiments, the reference "B" will be replaced with "A" which has been additionally written down after a reference numeral to designate the same or similar components as those in the cover device 40A, so that description will be omitted or simplified.

A measuring sequence in the present invention is discussed hereunder with reference to the flow diagram shown in FIG. 3.

Step 1

Before starting a measurement of the object W to be measured, it is necessary to input data concerning whether two master balls are necessary or not into a computer (not shown).

Steps 2, 3

For example, when the shape of the object W is as complicated as those in the above mentioned embodiment, one needs to use two master balls 52A and 52B, such as is shown in FIG. 1. While if the shape of the object W is simple such as a rectangular solid, cube and the like, so that only one master ball is needed to execute the measurement, one should input either the master ball 52A or 52B to the computer. However, if no master ball is selected, one needs to repeat the input operation from the Step 1.

Step 4

When setting up the machine to use both of the master balls 52A, 52B through Step 1, the cover 65A of the cover device 40A is opened along the arrow $P_1$-direction by, for example, the hand. In this situation, the touch signal probe 27 is moved in the direction $Y_1$ to place the probe 27 near the cover 40A by moving Y-axis moving device 20.

Step 5

The Z-slider 26 is moved downwardly along the arrow $Z_1$, and the X-axis moving device 23 is subsequently moved into the arrow $X_1$ direction to contact the touch signal probe 27 with the master ball 52A (illustrated with the alternate long and two short dashes) to thereby set the origin of measurement.

Step 6

The touch signal probe 27 is then moved away from the master ball 52A. The opened cover 65A is closed by the hand along the arrow $P_2$-direction.

Step 7

The touch signal probe 27 is moved into contact with the object W while keeping a record of its directions of movement and, conducting some available measurement.

Step 8

Checking whether all of the measurement on the dimensions and configuration of the object W are done or not. In this end, if the shape of the object W is rather simple, so that the measurement can be conducted using only the master ball 52A, the measurement is then finished.

Step 9

If the configuration of the object W is almost as complicated as those shown in FIG. 1, so that such an input is sent to the computer that not only the master ball 52A but also the master ball 52B should be used for measurement, the detector 28 is rotated along the arrow $R_1$-direction. The touch signal probe 27 is then turned as illustrated with the alternate long and two short dashes at the nearly center portion of the FIG. 1 in order to set the origin of measurement of the master ball 52B.

Step 10

The Y-axis moving device 20 is moved into the arrow $Y_1$-direction. The touch signal probe 27 is moved adjacent to the cover device 40B. The cover 65B is opened by the hand along the $P_1$-direction.

Step 11

The X-axis moving device 23 is moved along the arrow $X_2$ to contact the touch signal probe 27 with the master ball 52B to thereby set the origin of measurement.

Step 12

The touch signal probe 27 is moved away from the master ball 52B. The opened cover 65B is closed by the hand.

Step 13

The touch signal probe 27 is again moved to contact the object W.

Step 14

It is checked whether all of the measurement on the dimensions and configuration of the object W are done or not. In this end, if all of the measurement is actually finished, the coordinate measuring machine is stopped in its operation. While, if not finished yet, the touch signal probe 27 is moved into the predetermined direction to repeat the above steps, measuring all of the dimensions and configuration of the object W.

According to the above embodiment, the following effects can be attained.

Since the origin point blocks 50A, 50B which each have their own master balls 52A, 52B are provided in the cover devices 40A, 40B each having the covers 65A, 65B capable of the opening and closing motion, it is available to expose the master balls 52A, 52B from the cover devices 40A, 40B only when the touch signal probe 27 is contacted with the master balls 52A, 52B to set the origin to be measured. Then even if the coordinate measuring machine 10 in the present invention is installed in a factory, whereat dust is controlled, the dust hardly attaches to the master balls 52A, 52B. This causes the touch signal probe 27 to contact the master balls 52A, 52B so as to set the origin of measurement, hence the dimensions and configuration of the object W are precisely measured.

Since each shape of the boxes 62A, 62B of the cover devices 40A, 40B is formed into a sectional trapezoid shape to surround the origin point block 50A or 50B, when opening the covers 65A, 65B, the almost whole body of the origin point blocks 50A, 50B are exposed. Therefore, the touch signal probe 27 is available to approach the master balls 52A, 52B to define the origin of measurement. However, if each shape of the cover devices 40A, 40B is a cube and the like, the covers 65A, 65B should be enlarged to expose the origin point blocks 50A, 50B because each block is turned at angle at an a portion thereof and then the cover devices 40A, 40B become larger than before. It can be said that the sectional trapezoid shape is also advantageous for the cover devices 40A, 40B to make it small in size and for the base plate 12 to effectively use its space for measurement.

Figure 4:
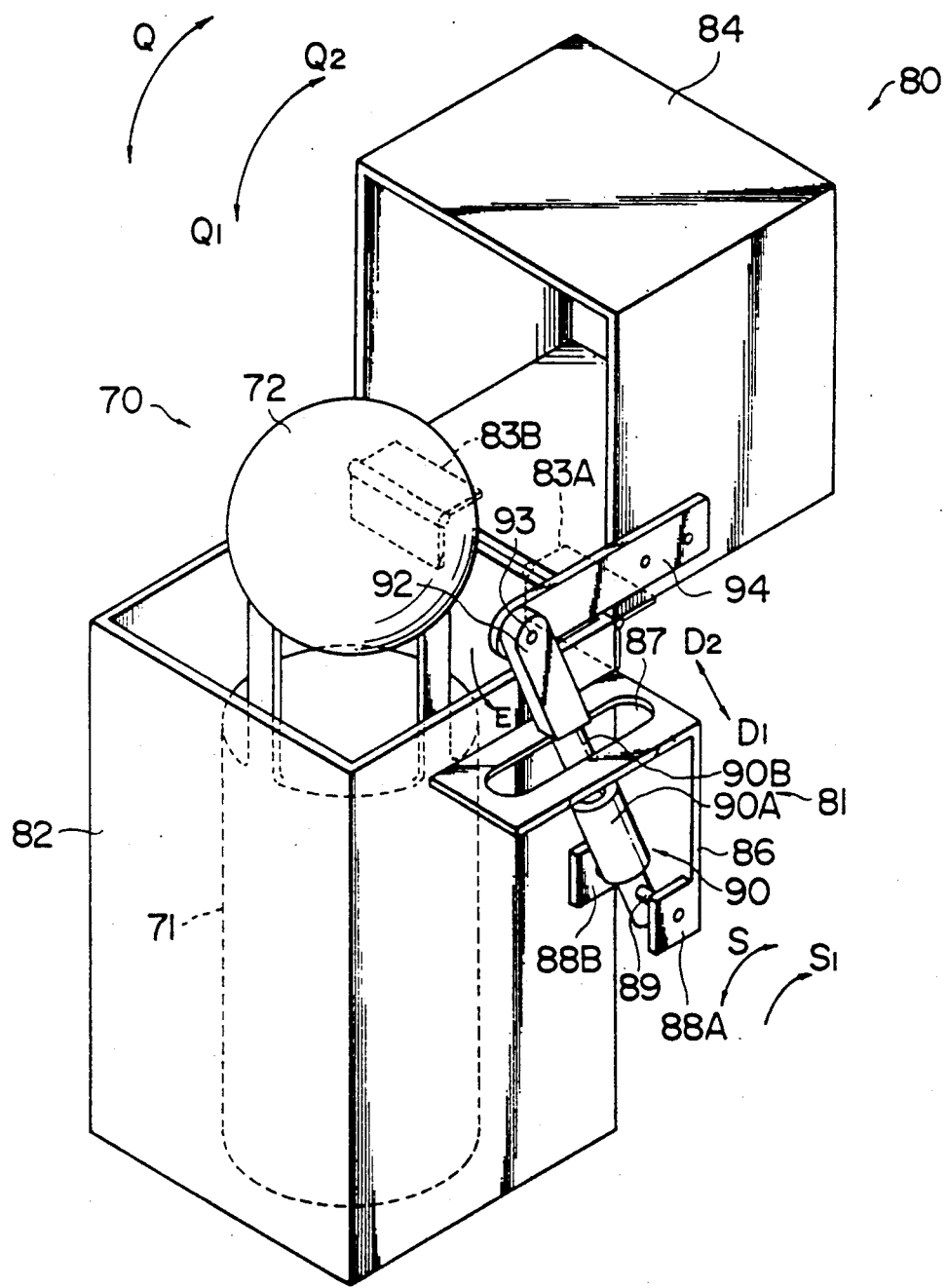
FIG. 4 is a fragmentary perspective view of a second embodiment.

FIG. 4 shows a fragmentary perspective view of a second embodiment of the present invention. In the second embodiment, there is provided another origin point block 70, which is constructred with a main body 71 not turned at angle and a master ball 72 mounted at a top of the main body 71, and a drive device 81 for reciprocally opening and closing a cover device 80 housing the origin point block 70.

The cover device 80 consists of a box 82 for surrounding the origin point block 70, a cover 84 which has a corresponding configuration to cover the opening of the box 82, which order is joined with the box 82 by hinge fittings 83A, 83B to allow it to swing around the box 82 into the arrow Q-direction, and a drive device 81 which is connected to the box 82 and the cover 84 for an opening and closing motion of the cover.

The drive device 81 has a L-shaped bracket 86 fixed to the box 82. The bracket 86 has a long opening 87 in its horizontally extending surface and supporting plates 88A, 88B at both sides of a lower end portion, between which sides a guide bar 89 extends.

The guide bar 89 supports one end of a cylinder 90 so as to enable to swing along the arrow S and also enable a cylinder rod 90B to move backwards and forwards along the arrows D1 and D2. The cylinder 90 includes a cylindrical body 90A, in which the cylinder rod 90B is reciprocally supported, which rod extends through the long opening 87. The free end portion of the cylinder rod 90B has a supporting member 92 thereon. The supporting member 92 is used for making a plate 94 fixed to the cover 84 turn round on a pivot 93.

To close the cover 84 of the cover device 80, the cylinder 90 is activated to cause the cylinder rod 90B to be moved in the arrow D1 direction to turn the plate 94 about the arrow E direction. In this operation, the cylinder 90 is swung along the arrow S1 and the cover 84 is moved along the arrow Q1 by the plate 94. In this end, the closing operation of the cover 84 will be completed by stopping the movement of the cylinder rod 90B when the cover 84 contacts the box 82.

While opening the cover 84, the cover is moved in the arrow Q2 direction by the plate 94 because of the movement of the cylinder rod 90B in the direction D2 opposite to that in the closing mode. The opening mode will be completed by stopping the movement of the cylinder rod 90B at a position where the end face of the cover 84 is perpendicular to the end face of the box 82 (as shown in the drawing).

Accordingly, the opening and closing motion of the cover 84 can be automatically executed by the drive device 81 having a cover device 80 for surrounding the origin point block 70. Such an arrangement is advantageous for automatic manipulation of the motion of the cover 84 and the measurement of the object W. It is of course expected that no dust accumulates on the master ball 72.

The long opening 87 can prevent the displacement of the cylinder 90 along the axle or guide bar 89 so that the swing motion of the cylinder 90 is conducted smoothly and with certainty. There can be no accidents, for example, such as fingers of an operator being put between the cylinder body 90A and the cylinder rod 90B during the opening and closing operation of the cover 84, since the cylinder rod 90B is covered well.

The present invention is not to be limited to the above mentioned arrangements. Some of the modifications and changes in planning are to be included unless they deviate from the subject of the present invention.

In the first embodiment, the origin point blocks 50A, 50B which respectively have a portion of the main body 51A, 51B each turned at angle. While, in the second embodiment, the origin point block 70, wherein the main body 71 is not turned at an angle, is employed for setting the origin of measurement.

The shapes and dimensions of the origin point blocks and the cover for surrounding them should not be limited to that in the above mentioned embodiments but can be changed so as to comply with an occasional necessities. In other words, the origin point blocks do not necessarily have to have master balls respectively, but to have three surfaces perpendicular to each other or to have something for setting the origin of measurement.

The cover devices 40A, 40B may have the same drive device respectively as in the second embodiment. The drive device 81 in the second embodiment may be manually operated by hand. The shape of the covers 65A, 65B and 84 of the cover devices 40A, 40B and 80 are variable.

The number of the origin point blocks 50A, 50B and the cover devices 40A, 40B do not need to be limited to two but may be one or more than three. The number may be selected depending upon a shape of an object W.

In the second embodiment, the drive device 81 was so arranged that the cylinder body 90A of the cylinder 90 is fixed to the box 82 and the cylinder rod 90B is fixed to the cover 84. However, the contrary arrangement of them may be employed. In other words, it is enough for the present invention that one portion of the cylinder 90 be connected to the box 82 so as to swing itself, the other portion thereof be connected to the cover 84 so as to open it or close it. In this connection, the joint between the other portion of the cylinder 90 and the cover 84 does not always have to be the plate 94.

The supporting member for the cylinder 90 of the drive device 81 is not to be limited to the L-shaped bracket 86 above embodiment, but may be framed, so as to surround the cylinder 90, and yet ensure that the cylinder 90 will swing round to the box 82.

The drive device 81 does not need to be the cylinder 90 but may be a rotating-type actuator or something to open and close the cover 84.

The cover devices 40A, 40B and 80 may not be separated into the boxes 62A, 62B and 82 and the covers 65A, 65B and 84, but unified devices with the boxes 62A, 62B and 82 and the covers 65A, 65B and 84 so as to effect the opening and closing motion. Otherwise, if the boxes 62A, 62B and 82 and the covers 65A, 65B and 84 are individually provided, the covers do not need to move around a pivot for opening and closing motion but move straight vertically or horizontally.

Industrial Applicability

As has been described, the origin point block is enclosed by the cover device so that the dust suspended in the air cannot become attached to the origin point block. It is thereby possible to set the origin for measurement and thereby execute a precise measurement of the object.

The embodiments of the invention in which an exclusive property or privilege is claimed are defined as follows:

1. A coordinate measuring machine, comprising:
   a base plate for facilitating the placement of an object to be measured thereon;
   origin point block means provided on said base plate for defining an origin of measurement;
   a detector;
   moving means for moving said detector to said origin point block means to set the origin of measurement and thereafter moving in horizontal and vertical directions until contact with the object to be measured occurs for detecting the dimensions and configuration of the object; and
   at least one removable cover device for covering and occasionally exposing each of said origin point block means, said removable cover device including a box having space inside for enclosing said origin point block means, an openable and closeable cover having a shape conforming to said box, and drive means which is connected to said box and said cover for effecting an opening and closing motion of said cover.

2. The coordinate measuring machine according to claim 1, wherein said drive means includes a telescopic fluid cylinder, one end of which is joined with said box, an other end of which is joined with said cover.

3. The coordinate measuring machine according to claim 2, wherein a longitudinal axis of said cylinder is tilted at an angle to the vertical direction when said cylinder is operated.

4. The coordinate measuring machine according to claim 2, wherein said other end portion of said cylinder is connected to a fixing plate mounted on said cover.

* * * * *